(12) United States Patent
Clendenen et al.

(10) Patent No.: US 9,431,881 B2
(45) Date of Patent: Aug. 30, 2016

(54) ELECTRIC MACHINE HOUSING

(71) Applicant: Regal Beloit America, Inc., Beloit, WI (US)

(72) Inventors: David Allen Clendenen, Fort Wayne, IN (US); Michael A. Marks, Fort Wayne, IN (US); Peter B. Lytle, Fort Wayne, IN (US); Harold Clifton Kingrey, Huntington, IN (US); Steven P. Richardville, LaOtto, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 544 days.

(21) Appl. No.: 13/838,432

(22) Filed: Mar. 15, 2013

(65) Prior Publication Data

US 2014/0265748 A1 Sep. 18, 2014

(51) Int. Cl.
*H02K 11/00* (2016.01)

(52) U.S. Cl.
CPC .......... *H02K 11/33* (2016.01); *Y10T 29/49009* (2015.01)

(58) Field of Classification Search
CPC ........................ H02K 11/0068; H02K 11/0073
USPC ......................................................... 361/707
See application file for complete search history.

(56) References Cited

U.S. PATENT DOCUMENTS

| | | | | |
|---|---|---|---|---|
| 3,300,666 | A * | 1/1967 | Frazier | H02K 5/15 29/596 |
| 5,191,512 | A * | 3/1993 | Ogura | H01L 23/4006 257/E23.084 |
| 6,025,665 | A | 2/2000 | Poag et al. | |
| 6,049,459 | A * | 4/2000 | Edmonds | H01L 23/4006 165/185 |
| 6,078,121 | A | 6/2000 | Poag et al. | |
| 6,324,745 | B1 | 12/2001 | Poag et al. | |
| 6,704,201 | B2 * | 3/2004 | Kasuga | H01L 25/11 165/185 |
| 6,742,413 | B2 * | 6/2004 | Schwital | H02K 7/1166 310/89 |
| 7,042,212 | B2 | 5/2006 | Yoshikawa et al. | |

* cited by examiner

*Primary Examiner* — Thomas Truong
(74) *Attorney, Agent, or Firm* — Armstrong Teasdale LLP

(57) ABSTRACT

A housing for enclosing electronics of a motor having an axis of rotation is provided. The housing includes an end cap having an outer surface and an inner surface. A control board is coupled to the inner surface, wherein the printed circuit board includes a first side, a second side and an edge located between the first side and the second side. The housing further includes a first circuit coupled to the first side which includes a plurality of first electrical components. Each first electrical component includes a tab extending beyond the edge. A second circuit is coupled to the second side and a fastener assembly is coupled to the tab and the inner surface.

15 Claims, 7 Drawing Sheets

ELECTRIC MACHINE HOUSING

BACKGROUND OF THE INVENTION

The embodiments described herein relate generally to electrical machines and associated electronics, and more particularly, to methods and systems for securing electrical components within the electrical machines and dissipating heat from the electrical components.

Certain electrical machines are sometimes referred to as brushless motors. Brushless motors include both brushless AC motors and brushless DC motors and are used in a wide variety of systems operating in a wide variety of industries. Motors commonly include a stator having a plurality of stacked laminations and a central bore for receiving a rotor and associated bearings. A housing encloses the motor and electronics that control the motor. The housing includes a pair of end frames or end caps that can be coupled to opposite ends of the stator to facilitate supporting the rotor.

If not properly dissipated, heat generated by electronics and/or other components during operation of the electrical machine can shorten the life span of various electronics and/or motor components and/or generally result in poor performance of the electrical machine. Electronics generally include a second circuit which has solid state switching devices for commutating the power supplied to the electronically commutated motor to effect the energization of motor. A first circuit has various solid state components for controlling the conductivity of the switching devices. Conventional electronics may include a power board to support the second circuit and a control board to support the first circuit. An insulating board may be used to electrically isolate the power board from the control board. Multiple boards, however, may increase manufacturing costs, operating costs, maintenance costs and/or replacement costs.

Moreover, some of the solid state components, e.g., transistors, need to be relatively large to accommodate the currents that must pass during operation of the electrical machine. Large transistors can produce a sizable amount of heat that should be dissipated from the transistors in order to keep them functioning properly. Transistors also may take up a large amount of control board space which may also increase manufacturing costs, operating costs, maintenance costs and/or replacement costs and/or may increase operating losses. Further, securing the transistors to the central board applies stress and wear to control board, which may lead to failure of control board.

BRIEF DESCRIPTION OF THE INVENTION

In one aspect, a housing for enclosing electronics of a motor having an axis of rotation is provided. The housing includes an end cap which has an outer surface and an inner surface. A control board is coupled to the inner surface, wherein the printed circuit board includes a first side, a second side and an edge located between the first side and the second side. The housing further includes a first circuit coupled to the first side, wherein the first circuit includes a plurality of first electrical components. Each first electrical component includes a tab extending beyond the edge. A second circuit is coupled to the second side and a fastener assembly is coupled to the tab and the inner surface.

In another aspect, an electrical machine having an axis of rotation is provided. The electrical machine includes a motor having a stator, a rotor coupled to the stator and a motor shaft coupled to the rotor along the axis of rotation. A housing is coupled to and encloses the motor. The housing includes an end cap having an outer surface and an inner surface. A printed circuit board is coupled to the inner surface and includes a first side, a second side and an edge located between the first side and the second side. A first circuit is coupled to the first side and includes a plurality of first electrical components. Each first electrical component includes a body coupled to the first side and a tab extending beyond the edge. The electrical machine further includes a second circuit coupled to the second side and a fastener assembly coupled to the tab and the inner surface.

In yet another aspect, a method of assembling an electrical machine is provided. The method includes coupling a pair of first electrical components to a first side of a printed circuit board. Method further includes coupling a plurality of second electrical components to a second side of the printed circuit board and positioning a tab of each first electrical component beyond an edge of the printed circuit board. A fastener is coupled to the tab and an end cap of the housing.

DETAILED DESCRIPTION OF THE INVENTION

The embodiments described herein relate to electrical machines and methods of assembling the electrical machines. More particularly, the embodiments relate to a housing that is configured to facilitate securing electrical components and dissipating heat from the electrical components housed within the electrical machine. More particularly, the embodiments relate to an end cap, a control board and a fastening assembly coupled to the end cap and to the control board. It should be understood that the embodiments described herein for electrical machines are not limited to motors, and further understood that the descriptions and figures that utilize a motor, a control board and an end cap are exemplary only. Moreover, while the embodiments illustrate a three phase electric motor, the embodiments described herein may be included within motors having any number of phases, including single phase and multiple phase electric motors.

Figure 1:
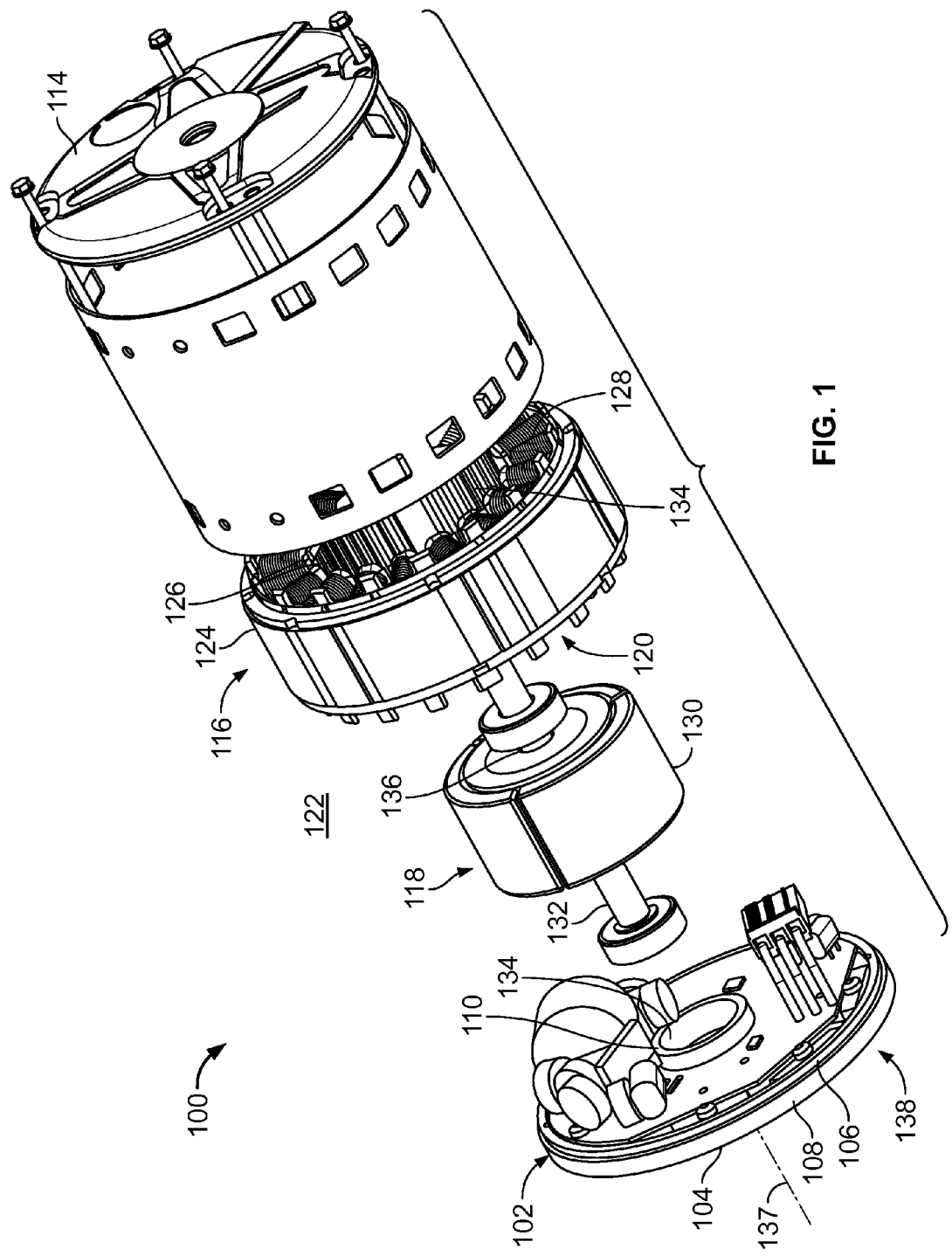
FIG. 1 is a cutaway view of an exemplary electric motor and an exemplary housing and control system coupled to the motor for use in controlling operation of motor.

FIG. 1 is a cutaway view of an exemplary electrical machine 100 that can be operated as either a generator or a motor 100 and a view of an exemplary housing 102 and control system 138 coupled to motor 100 for use in controlling operation of motor 100. Electric motor 100 includes housing 102 having a first end cap 104 and a second end cap 114. First end cap 104 includes an inner surface 106 and an outer surface 108. Moreover, first end cap 104 includes a bearing cylinder 110 and a sound dampener 112 (shown in FIG. 6). Electric motor 100 further includes a stationary assembly 116 and a rotatable assembly 118. Motor assembly housing 102 defines an interior 120 and an exterior 122 of motor 100 and is configured to at least partially enclose and protect stationary assembly 116 and rotatable assembly 118. Stationary assembly 116 includes a stator 124, which includes a plurality of stator teeth 126 and a plurality of winding stages 128 wound around stator teeth 126 and adapted to be electronically energized to generate an electromagnetic field. In the exemplary embodiment, a variable frequency drive (not shown) provides a signal, for example, a pulse width modulated (PWM) signal, to electric motor 100.

In an exemplary embodiment, stationary assembly 116 is a three phase concentrated wound stator assembly and stator 124 is formed from a stack of laminations (not shown) made of a magnetically permeable material. While stationary assembly 116 is illustrated for purposes of disclosure, it is contemplated that other stationary assemblies of various other constructions having different shapes, configurations, phases and different numbers of teeth may be utilized.

Rotatable assembly 118 includes a rotor 130 such as, for example, permanent magnet rotor or an induction rotor and a shaft 132. Rotatable assembly 118 may also be referred to as an interior permanent magnet rotor. Examples of motors that may include interior permanent magnet rotors include, but are not limited to, electronically commutated motors (ECMs). ECMs may include, but are not limited to, brushless direct current (BLDC) motors, brushless alternating current (BLAC) motors, and synchronous reluctance motors.

In the exemplary embodiment, rotor 130 is formed from a stack of laminations (not shown) made of a magnetically permeable material and is substantially received in a central bore 134 of stator 124. Rotor 130 includes a shaft opening 136 having a diameter corresponding to a diameter of shaft 132. Rotor 130 and shaft 132 are concentric and configured to rotate about an axis of rotation 137. Stator 124 and rotor 130 are illustrated as being solid in FIG. 1 for simplicity, their construction being well known to those of ordinary skill in the art. For example, stator 124 and rotor 130 may be formed using a sintering process from a soft magnetic composite (SMC) material, a soft magnetic alloy (SMA) material, and/or a powdered ferrite material.

Winding stages 128 are commutated without brushes by sensing the rotational position of rotatable assembly 118 as it rotates within stator 124 and utilizing electrical signals generated as a function of the rotational position of rotatable assembly 118 sequentially to apply a voltage to each of winding stages 128 in different preselected orders or sequences that determine the direction of the rotation of rotatable assembly 118.

A control system 138 is coupled to first end cap 104 and is connected to winding stages 128 and applies a voltage to one or more winding stages 128 at a time for commutating winding stage 128 in a preselected sequence to rotate rotatable assembly 118 about axis of rotation 137. Position sensing may be accomplished by a position-detecting circuit (not shown) responsive to the back electromotive force (EMF) to provide a simulated signal indicative of the rotational position of rotatable assembly 118 to control the timed sequential application of voltage to winding stages 128 of stationary assembly 116. Other means of position sensing may also be used. Motor 100 includes a voltage rating which is determined by motor manufacturer and which is stored in control system 138. Motor 100 further includes a pre-determined operating threshold, which is also stored in control system 138, for efficient operation of motor 100.

Figure 2:
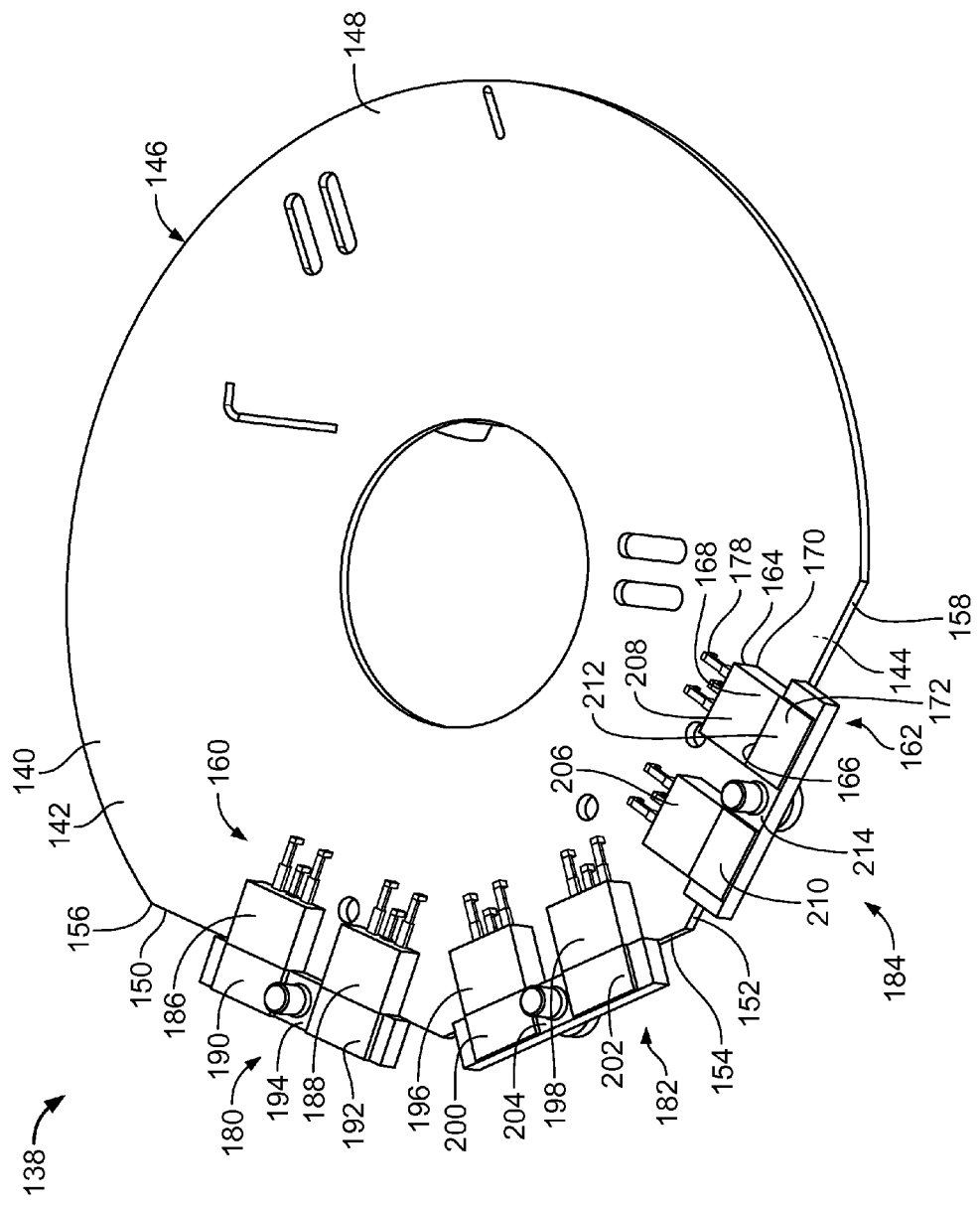
FIG. 2 is a perspective view of the housing of the electric motor shown in FIG. 1.

FIG. 2 is a perspective view of control system 138 of motor 100. In the exemplary embodiment, control system 138 includes a control board 140, such as a printed circuit board, wherein control board 140 includes a first side 142 and a second side 144. Printed circuit board includes an edge 146 located between first side 142 and second side 144. In the exemplary embodiment, edge 146 includes an arcuate portion 148, a first straight portion 150, a second straight portion 152 and a third straight portion 154. First straight portion 150 is coupled to a first end 156 of arcuate portion 148 and second straight portion 152 is coupled to a second end 158 of arcuate portion 148. Third straight portion 154 is coupled to first straight portion 150 and second straight portion 152. In the exemplary embodiment, first straight portion 150 is angled between first end 156 and third straight portion 154 and second straight portion 152 is angled between second end 158 and third straight portion 154.

A first circuit 160 is coupled to first side 142 and includes a plurality of first electrical components 162. In the exemplary embodiment, each first electrical component 162 includes a transistor such as, for example, an insulated-gate bipolar transistor. Alternatively, first electrical components 162 include any configuration such as capacitors and resistors that enables operation of first circuit 160. Each first electrical component 162 includes a front 164, a back 166, a top 168, a bottom 170 and a tab 172. Tab 172 extends from back 166 and has an inner surface 174 and outer surface 178 that are an extension of, and are substantially parallel to top 168. A plurality leads 178 extend from front 164 of first electrical component 162. In the exemplary embodiment, leads 178 extend substantially parallel to first side 142 and maintain a substantially constant separation distance from first side 142. Leads 178 extend from front 164 in a location that is closer to first side 142 than to top 168, such that leads 178 remain relatively close to first side 142 throughout their length. Only a small separation distance exists between leads 178 and first side 142. The small separation distance allows conformal coating to easily encapsulate leads 178 which helps to protect leads 178 from damage and harsh environments. Moreover, the encapsulation of leads 178 facilitates reducing failures caused by moisture in the area of high potential. To insert leads 178 into first side 142, leads 178 are formed at right angles from front 164 and extend into first side 142 to electrically couple first electrical components to control board 140.

The plurality of first electrical components 162 includes groupings of first electrical components 162 such as, but not limited to, a first pair 180 of first electrical components 162, a second pair 182 of first electrical components 162 and a third pair 184 of first electrical components 162. The plurality of first electrical components 162 are not limited to three pairs of first electrical components 162 but may include less than three pair or more than three pairs of first electrical components 162. Moreover, the groupings of first electrical components 162 are not limited to a pair of first electrical components 162 but may include a single first electrical component 162 or more than two first electrical components 162. Any number of first electrical components 162 and/or any number of groupings of first electrical components 162 may be used to enable first circuit 160 to function as described herein. First pair 180 of first electrical components 162 includes first electrical component 186 and first electrical component 188 separated by a first space 194. Tab 190 is coupled to first electrical component 186 and tab 192 is coupled to first electrical component 188. Second pair 182 of first electrical components 162 includes a first electrical component 196 and a first electrical component 198 separated by a second space 204. Tab 200 is coupled to first electrical component 196 and tab 202 is coupled to first electrical component 198. Third pair 184 of first electrical components 162 includes a first electrical component 206 and a first electrical component 208 separated by a third space 214. Tab 210 is coupled to first electrical component 206 and tab 212 is coupled to first electrical component 208. In the exemplary embodiment, tabs 190, 192, 200, 202, 210 and 212 extend beyond edge 146. More particularly, tabs 190, 192 extend beyond first straight portion 150, tabs 200, 202 extend beyond second straight portion 154 and tabs 210, 212 extend beyond third straight portion 152. First straight portion 150, second straight portion 152 and third straight portion 154 are configured to suspend tabs 190, 192, 200, 202, 210 and 212 from edge 146 to facilitate exposing tab inner surfaces 174 and outer surfaces 176 as described herein.

Figure 3:
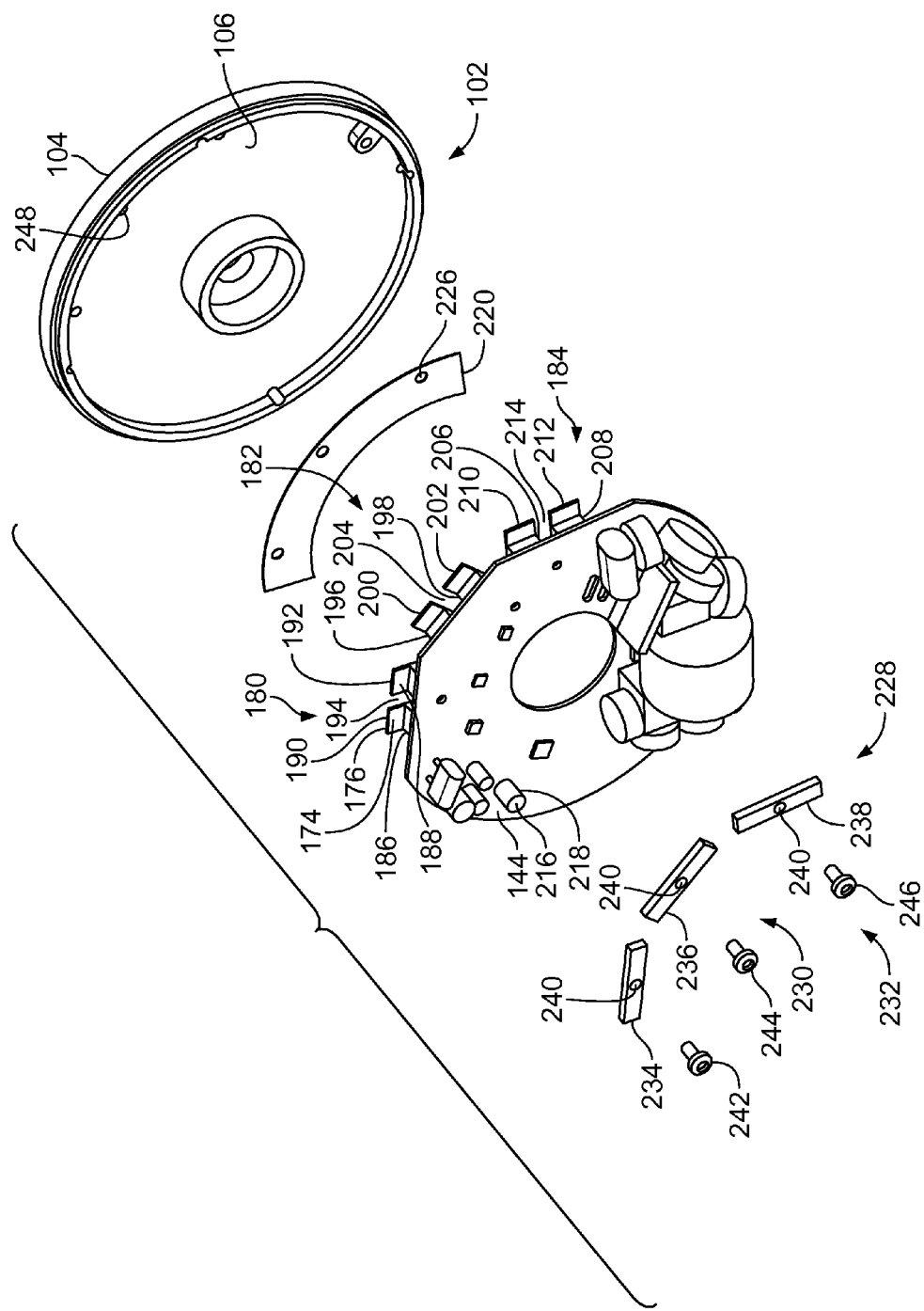
FIG. 3 is an exploded view of the control board and an end cap of the housing shown in FIG. 1.

FIG. 3 is an exploded view of housing 102. A second circuit 216 is coupled to second side 144 and includes a plurality of second electrical components 218 coupled to second side 144. Second side 144 includes more board space to accommodate additional and/or larger second electrical components 218. Additional and/or larger second electrical components 218 are coupled to second side 144 to maximize circuit capabilities. In the exemplary embodiment, installation of first electrical components 162 is more efficient since first side 142 is free from interferences by second electrical components 218. Still further, the coupling of first electrical components 162 to first side 142 reduces and/or eliminates the need for a separate power board (not shown) and/or a separate insulating board (not shown).

In the exemplary embodiment, housing 102 includes a thermal pad 220 which has an inner side 222 orientated toward board first side 142 and an outer side 224 orientated toward end cap inner surface 106. Thermal pad 220 includes a plurality of openings 226 for coupling thermal pad 220 to inner surface 106 of first end cap 104 and first electrical components 162 as described herein. Thermal pad 220 is configured to facilitate heat transfer from first electrical components 162 and to first end cap 104. Moreover, housing 102 includes a fastening assembly 228 having a plurality of clamp bars 230 and a plurality of fasteners 232 such as, for example bolts. Alternatively, fasteners 232 may include other configurations such as solder welds and adhesives. Fastener 232 can include any configuration to enable fastening assembly 228 to function as described herein. In the exemplary embodiment, clamp bars 230 include a first clamp bar 234, a second clamp bar 236 and a third clamp bar 238, wherein in each clamp bar 234, 236 and 238 has an opening 240 defined therethrough. Moreover, the plurality of fasteners 232 includes a first fastener 242, a second fastener 244 and a third fastener 246. Fastening assembly 228 can include any number of clamp bars 230 and any number of fasteners 232 to enable fastening assembly 228 to function as described herein.

Figure 4:
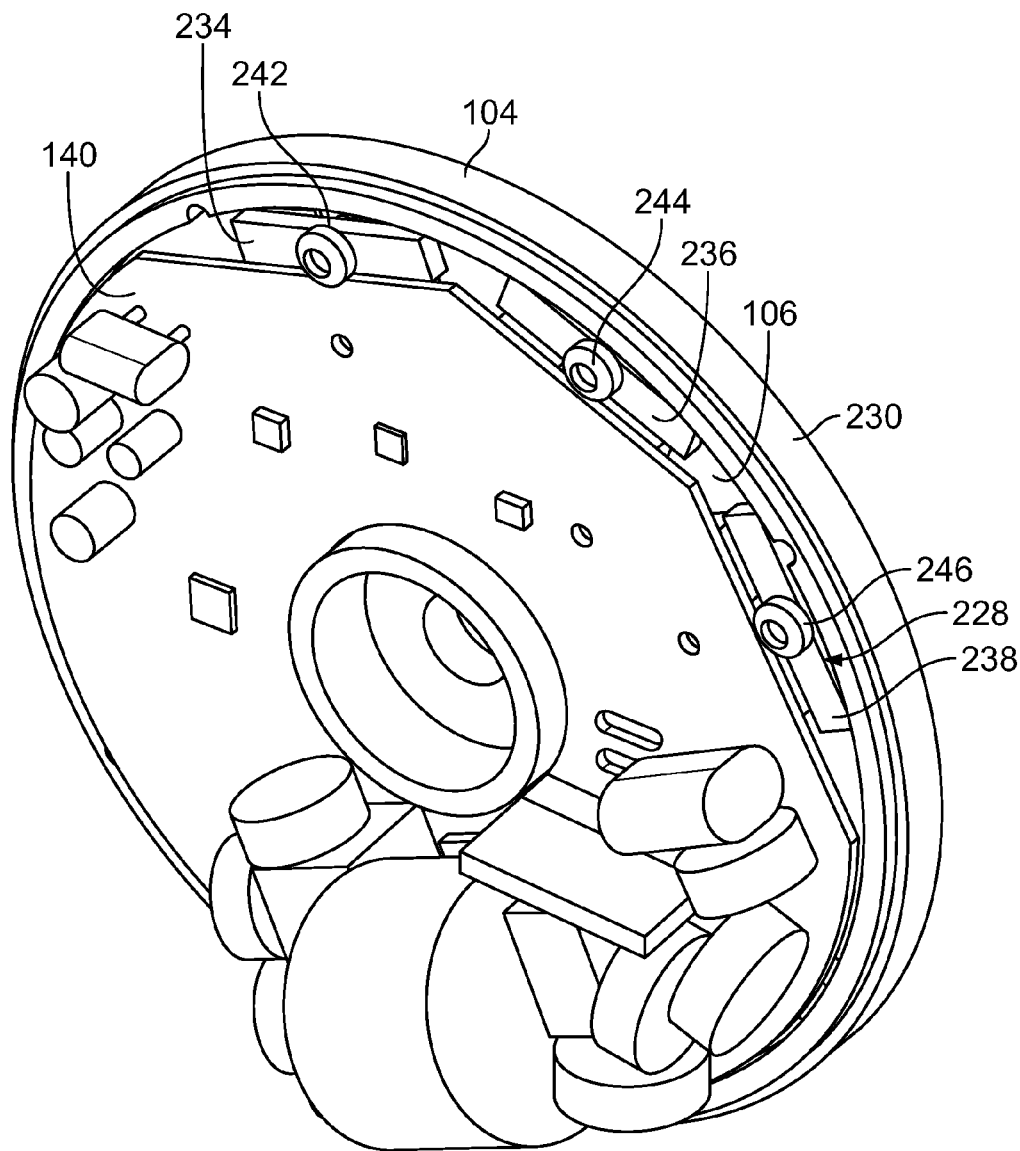
FIG. 4 is a front perspective view of the control board coupled to the end cap shown in FIG. 3.
Figure 5:
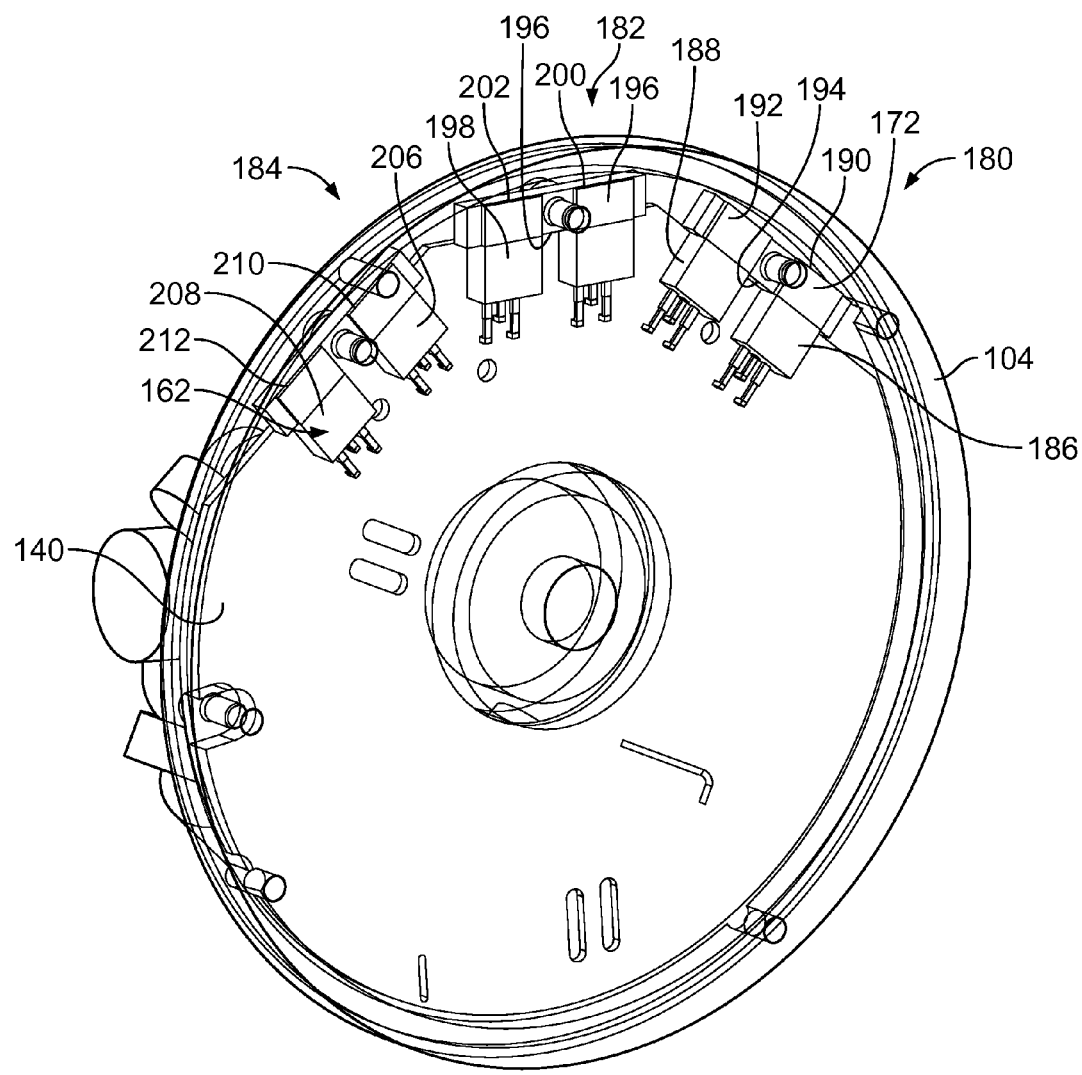
FIG. 5 is a rear perspective view of the control board coupled to the end cap shown in FIG. 3.

FIG. 4 is a front perspective view of control board 140 coupled to first end cap 104. FIG. 5 is a rear perspective view of control board 140 coupled to first end cap 104. In the exemplary embodiment, first clamp bar 234 couples to first electrical component 186 and first electrical component 188 of first control pair 180. Moreover, second clamp bar 236 couples to first electrical component 196 and first electrical component 198 of second control pair 182. In the exemplary embodiment, third clamp bar 238 couples to first electrical component 206 and first electrical component 208 of third control pair 184. The plurality of clamp bars 230 couple to inner sides 174 of tabs 190, 192, 200, 202, 210 and 212. More particularly, first clamp bar 234 couples to tabs 190, 192, second clamp bar 236 couples to tabs 200, 202 and third clamp bar 238 couples to tabs 210 and 212. Fastener assembly 228 couples the plurality of first electrical components 162 to thermal pad 220 and to inner surface 106 of first end cap 104.

In the exemplary embodiment, first bolt 242 is inserted through first clamp bar 234 and within first space 194 between tabs 190, 192. First bolt 242 is further inserted through thermal pad opening 226 and end cap opening 248 to fixedly couple first electrical component 186 and first electrical component 188 to thermal pad 220 and end cap inner surface 106. Similarly, second bolt 244 is inserted through second clamp bar 236 and within second space 204 between tabs 200, 202. Second bolt 244 is further inserted through thermal pad opening 226 and end cap opening 248 to fixedly couple first electrical component 200 and first electrical component 202 to thermal pad 220 and end cap inner surface 106. Moreover, third bolt 246 is inserted through third clamp bar 238 and within third space 214 between tabs 210, 212. Third bolt 246 is further inserted through thermal pad opening 226 and end cap opening 248 to fixedly couple first electrical component 210 and first electrical component 212 to thermal pad 220 and end cap inner surface 106. Clamp bars 234, 236 and 238 couple to suspended tabs 190, 192, 200, 202, 210 and 212, as opposed to control board 140 to facilitate reducing and/or eliminating stresses and localized wear applied to control board 140. Alternatively, clamp bars 234, 236 and 238 can couple to control board 140 to enable motor 100 to function as described herein.

First electrical components 162 are capable of producing significant heat depending on the amount of current that flows through them. The heat should be dissipated from first electrical components 162 and motor 100 in order to ensure proper operation of motor 100. Top 168 of each first electrical component 162 is in thermal contact with thermal pad 220. Thermal pad 220 couples to inner surface 106 and conducts the heat generated by first electrical components 162 away from first electrical components 162 and into inner surface 106. Outer surface 108 includes a plurality of raised fins 249. In one embodiment, first end cap 104 is fabricated from cast aluminum and serves a heat sink for first electrical components 162. The heat from first electrical components 162 travels through thermal pad 220 and to first end cap 104 and is dissipated from recessed fins 249 to the ambient environment. This heat dissipation helps reduce stress on first electrical components 162 and/or control board 140.

Housing 102 includes a thermal pathway that allows heat to be dissipated from interior 120 of motor 100, to the ambient environment. This thermal pathway enables control assembly 138 to be placed within interior 120 of motor housing 102. This interior placement eliminates the need for a separate compartment to house the electronic controls of motor 100, and facilitates reducing fabrication costs of motor 100. In addition, the orientation of the first electrical component leads 178 enables the leads 178 to be encapsulated and protected from potentially harsh environmental conditions. Moreover, housing 102 enables first electrical components 162 to couple to first ride 142 and second electrical components 218 to couple to second side 144 to eliminate a need for an insulation board. Still further, fastening assembly 228 couples to tabs 172, thermal pad 220 and end cap 104 to minimize and/or eliminate stress and/or wear applied to control board 140.

Figure 6:
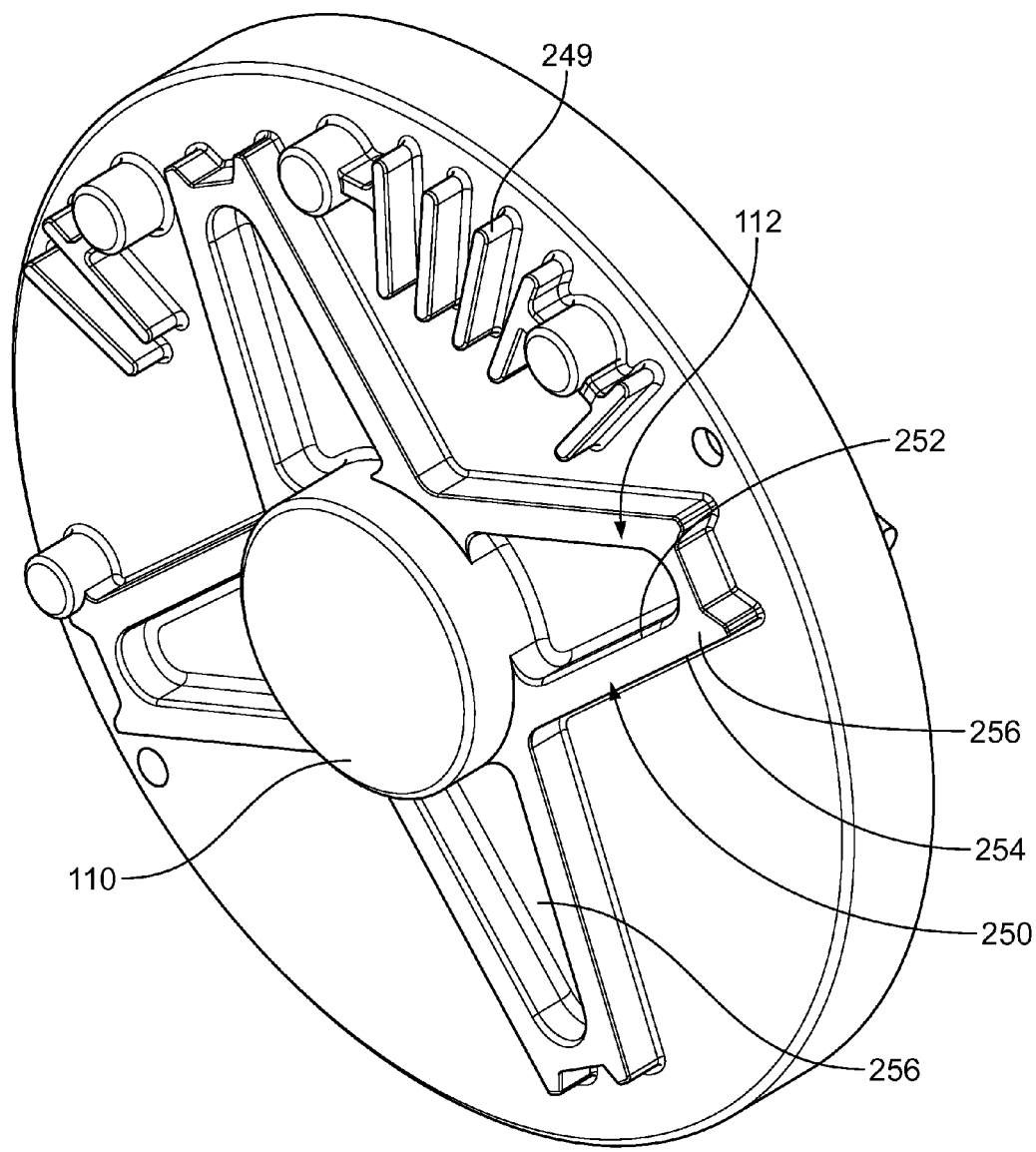
FIG. 6 is a rear perspective view of a sound dampener coupled to the end cap shown in FIG. 3.

FIG. 6 is a rear perspective view of sound dampener 112 coupled to first end cap 104 shown in FIG. 3. In the exemplary embodiment, sound dampener 112 is coupled to bearing cylinder 110 which is configured to house a rotor bearing (not shown). Sound dampener 112 includes a plurality of stiffeners 250 radially extending from bearing cylinder 110. Each stiffener includes a first side 252, a second side 254 and third side 256 extending between and coupled to first side 252 and second side 254. First side 252, second side 254 and third side 256 define a cavity 258 within an adjacent stiffener 250. Alternatively, first side 252, second side 254 and third side 256 may form an internal cavity (not shown) in communication with inner surface 106 of first end cap 104. Stiffeners 250 are configured to apply a pressure against bearing cylinder 110. Bearing cylinder 110 applies pressure to rotor bearing which maintains alignment of rotor 130 to facilitate reducing and/or eliminating noise emitted by rotor 130 rotating within rotor bearing.

Figure 7:
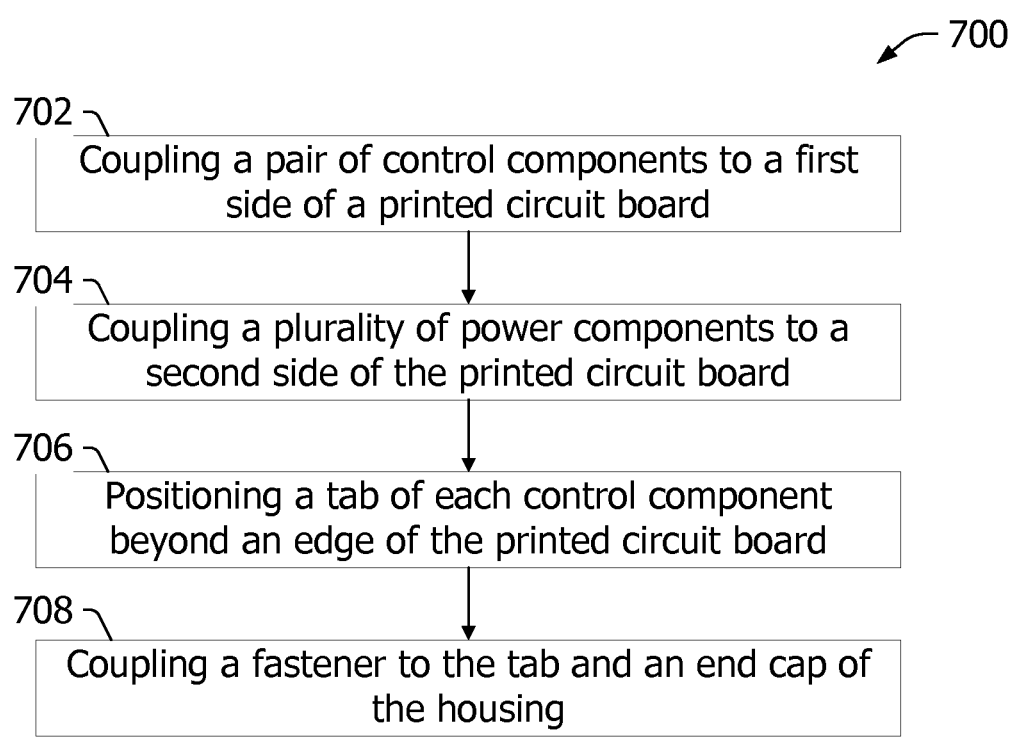
FIG. 7 is an exemplary flowchart illustrating a method of assembling an electrical machine.

FIG. 7 is an exemplary flowchart illustrating a method 700 of assembling an electrical machine, such as electrical machine 100 (shown in FIG. 1), having a housing, for example housing 102 (shown in FIG. 1). Method 700 includes coupling 702 a pair of first electrical components, for example first electrical components 162 (shown in FIG. 2), to a first side, such as first side 142 (shown in FIG. 2), of a printed circuit board, for example printed circuit board 140 (shown in FIG. 2). Method 700 further includes coupling 704 a plurality of second electrical components, for example second electrical components 218 (shown in FIG. 3), to a second side, such as second side 144 (shown in FIG. 2), of the printed circuit board. A tab, for example tab 172 (shown in FIG. 2), of each first electrical component is positioned 706 beyond an edge, such as edge 146 (shown in FIG. 2), of the printed circuit board. A fastener, for example fastener 232 (shown in FIG. 4), is coupled 708 to the tab and an end cap, such as end cap 104 (shown in FIG. 1). Method 700 also includes coupling the fastener to a thermal pad, for example thermal pad 220 (shown in FIG. 4). In the exemplary method 700, a sound dampener, such as sound dampener 112 (shown in FIG. 6), is coupled to the end cap.

A technical effect of the systems and methods described herein includes at least one of: a housing which includes an end cap having an outer surface and an inner surface; a printed circuit board that is coupled to the inner surface, wherein the printed circuit board includes a first side, a second side and an edge located between the first side and the second side; a first circuit coupled to the first side, wherein the first circuit includes a plurality of first electrical components such that each first electrical component includes a tab extending beyond the edge; a second circuit that is coupled to the second side and a fastener assembly that is coupled to the tab and the inner surface.

The exemplary embodiments described herein facilitate securing electrical components within an electrical motor and transferring heat from an electrical machine and/or electrical components housed therein. More particularly, the exemplary embodiments are configured to maximize heat transfer and minimize stresses applied to the control board of the electrical machine. Moreover, the exemplary embodiments dissipate heat from electrical machines located in a challenging environment such as a confined space and/or minimal or no forced air cooling for the electrical machine. Still further, the exemplary embodiments increase efficiency and reduce operating and maintenance costs associated with the electrical machine.

Exemplary embodiments of an electrical machine and methods for assembling the electrical machine are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

While the embodiments described herein are described with respect to motors in which a stator surrounds a rotor such as, for example, a permanent magnet rotor or an induction rotor, embodiments are contemplated in which an "inside-out" motor incorporates one or more of the improvements described herein. Inside-out motors refer to motors where a stationary stator is surrounded by a rotating rotor. Further, the embodiments are applicable to any permanent magnet rotating machine.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A housing for enclosing electronics of a motor having an axis of rotation, said housing comprising:
   an end cap comprising an outer surface and an inner surface;
   a control board coupled to said inner surface and comprising a first side, a second side and an edge located between said first side and said second side;
   a first circuit coupled to said first side and comprising a plurality of first electrical components, each first electrical component comprising a tab extending beyond said edge;
   a second circuit coupled to said second side; and
   a fastener assembly disposed beyond said edge, said fastener assembly coupled to said tab and said inner surface, said fastener assembly comprising a clamp bar and a fastener extending through said clamp bar, said end cap defining an opening that receives said fastener.

2. The housing of claim 1, further comprising a thermal pad coupled to said plurality of first electrical components and said inner surface.

3. The housing of claim 1, wherein said edge comprises an arcuate portion, a first straight portion, a second straight portion and a third straight portion.

4. The housing of claim 3, wherein said edge comprises a first end coupled to said first straight portion and a second end coupled to said second straight portion.

5. The housing of claim 1, wherein said plurality of first electrical components comprises a pair of first electrical components separated by a space and said fastener is positioned within said space.

6. The housing of claim 1, wherein said plurality of first electrical components comprises a pair of tabs separated by a space and said clamp bar couples to said pair of tabs.

7. The housing of claim 1, further comprising a sound dampener coupled to said outer surface.

8. The housing of claim 1, further comprising a bearing cylinder coupled to said outer surface and a sound dampener coupled to said bearing cylinder.

9. The housing of claim 1, further comprising a bearing cylinder coupled to said outer surface and a sound dampener coupled to said bearing cylinder, said sound dampener comprising a plurality of stiffeners radially extending from said bearing cylinder.

10. An electrical machine having an axis of rotation, said electrical machine comprising:
   a motor comprising a stator, a rotor coupled to said stator and a motor shaft coupled to said rotor along the axis of rotation; and
   a housing coupled to and enclosing said motor and comprising:
      an end cap comprising an outer surface and an inner surface;
      a control board coupled to said inner surface and comprising a first side, a second side and an edge located between said first side and said second side;
      a first circuit coupled to said first side and comprising a plurality of first electrical components, each first electrical component comprising a body coupled to said first side and a tab extending beyond said edge;
      a second circuit coupled to said second side; and
      a fastener assembly disposed beyond said edge, said fastener assembly coupled to said tab and said inner surface, said fastener assembly comprising a clamp bar and a fastener extending through said clamp bar, said end cap defining an opening that receives said fastener.

11. The electrical machine of claim 10, further comprising a thermal pad coupled to said plurality of first electrical components and said inner surface.

12. The electrical machine of claim 10, wherein said edge comprises an arcuate portion, a first straight portion, a second straight portion and a third straight portion.

13. The electrical machine of claim 12, wherein said edge comprises a first end coupled to said first straight portion and a second end coupled to said second straight portion.

14. The electrical machine of claim 10, wherein said plurality of first electrical components comprises a pair of first electrical components separated by a space and said fastener is positioned within said space.

15. The electrical machine of claim 10, wherein said plurality of first electrical components comprises a pair of tabs separated by a space and said clamp bar couples to said pair of tabs.

* * * * *